(12) United States Patent
Horsnell et al.

(10) Patent No.: US 11,663,034 B2
(45) Date of Patent: May 30, 2023

(54) PERMITTING UNABORTED PROCESSING OF TRANSACTION AFTER EXCEPTION MASK UPDATE INSTRUCTION

(71) Applicant: Arm Limited, Cambridge (GB)

(72) Inventors: Matthew James Horsnell, Cambridge (GB); Grigorios Magklis, Cambridge (GB); Richard Roy Grisenthwaite, Cambridge (GB); Stephan Diestelhorst, Cambridge (GB)

(73) Assignee: Arm Limited, Cambridge (GB)

( * ) Notice: Subject to any disclaimer, the term of this patent is extended or adjusted under 35 U.S.C. 154(b) by 356 days.

(21) Appl. No.: 16/651,017

(22) PCT Filed: Aug. 21, 2018

(86) PCT No.: PCT/EP2018/072495
§ 371 (c)(1),
(2) Date: Mar. 26, 2020

(87) PCT Pub. No.: WO2019/063200
PCT Pub. Date: Apr. 4, 2019

(65) Prior Publication Data
US 2020/0278882 A1    Sep. 3, 2020

(30) Foreign Application Priority Data
Sep. 29, 2017    (EP) .................................. 17386031

(51) Int. Cl.
*G06F 9/46*       (2006.01)
*G06F 9/38*       (2018.01)
(Continued)

(52) U.S. Cl.
CPC ............ *G06F 9/467* (2013.01); *G06F 9/3009* (2013.01); *G06F 9/3842* (2013.01);
(Continued)

(58) Field of Classification Search
None
See application file for complete search history.

(56) References Cited

U.S. PATENT DOCUMENTS 6,820,155 B1 * 11/2004 Ito ...................... G06F 9/4843
710/262
6,871,173 B1 * 3/2005 Brauch ................ G06F 11/0706
712/244
(Continued)

FOREIGN PATENT DOCUMENTS

CN    103514032 A  * 1/2014  ........... G06F 9/3004
CN    105138397       12/2015
(Continued)

OTHER PUBLICATIONS

Robert Bedichek, Some Efficient Architecture Simulation Techniques, Winter 1990 USENIX Conference, pp. 53-63 (Year: 1990).*
(Continued)

*Primary Examiner* — Abu Zar Ghaffari
(74) *Attorney, Agent, or Firm* — Nixon & Vanderhye P.C.

(57) ABSTRACT

A data processing apparatus has processing circuitry with transactional memory support circuitry to support execution of a transaction using transactional memory. In response to an exception mask updating instruction which updates exception mask information to enable at least one subset of exceptions which was disabled at the start of processing of a transaction, the processing circuitry permits un-aborted processing of one or more subsequent instruction of the transaction that follow the exception mask update instruction.

12 Claims, 7 Drawing Sheets

(51) Int. Cl.
*G06F 9/30* (2018.01)
*G06F 9/48* (2006.01)
*G06F 11/14* (2006.01)

(52) U.S. Cl.
CPC .......... *G06F 9/3851* (2013.01); *G06F 9/3861* (2013.01); *G06F 9/466* (2013.01); *G06F 9/4812* (2013.01); *G06F 11/1402* (2013.01); *G06F 11/1474* (2013.01)

(56) References Cited

U.S. PATENT DOCUMENTS

| | | | | |
|---|---|---|---|---|
| 7,882,339 | B2* | 2/2011 | Jacobson | G06F 9/526 712/244 |
| 2007/0282838 | A1* | 12/2007 | Shavit | G06F 9/3004 |
| 2010/0169623 | A1* | 7/2010 | Dice | G06F 9/526 712/E9.035 |
| 2010/0299472 | A1* | 11/2010 | Tanaka | G06F 9/4856 718/100 |
| 2010/0333093 | A1* | 12/2010 | Nussbaum | G06F 9/30087 711/144 |
| 2011/0209155 | A1* | 8/2011 | Giampapa | G06F 9/467 718/107 |
| 2012/0227045 | A1* | 9/2012 | Knauth | G06F 11/1407 718/100 |
| 2014/0115590 | A1* | 4/2014 | Blainey | G06F 13/4243 718/101 |
| 2015/0039869 | A1* | 2/2015 | Yamada | G06F 9/467 712/228 |
| 2015/0074311 | A1* | 3/2015 | McKenney | G06F 9/4812 710/269 |
| 2015/0193265 | A1* | 7/2015 | Riegel | G06F 9/467 711/145 |
| 2015/0242218 | A1* | 8/2015 | Shum | G06F 9/3842 712/216 |
| 2015/0248317 | A1* | 9/2015 | Belmar | G06F 9/466 714/47.2 |
| 2015/0261676 | A1 | 9/2015 | Busaba et al. | |
| 2016/0132337 | A1* | 5/2016 | Dixon | G06F 12/0862 712/208 |
| 2016/0378543 | A1* | 12/2016 | Warkentin | G06F 9/4818 710/262 |
| 2017/0177338 | A1* | 6/2017 | Gschwind | G06F 9/4812 |

FOREIGN PATENT DOCUMENTS

| | | |
|---|---|---|
| TW | 201413581 | 4/2014 |
| TW | 201710700 | 3/2017 |

OTHER PUBLICATIONS

Extended European Search Report for EP Application No. 17386031.3 dated Mar. 21, 2018, 8 pages.
International Search Report and Written Opinion of the ISA for PCT/EP2018/072495 dated Sep. 12, 2018, 13 pages.
Office Action for IN Application No. 202047011463 dated Mar. 11, 2022, 6 pages.
Office Action for EP Application No. 17386031.3 dated Mar. 22, 2021, 9 pages.
Office Action for TW Application No. 107131812 dated Mar. 24, 2022 and English translation, 15 pages.
Office Action for IL Application No. 273129 dated Oct. 23, 2022, 4 pages.
Office Action for KR Application No. 10-2020-7010275 dated Feb. 17, 2023 and English translation, 8 pages.

* cited by examiner

PERMITTING UNABORTED PROCESSING OF TRANSACTION AFTER EXCEPTION MASK UPDATE INSTRUCTION

This application is the U.S. national phase of International Application No. PCT/EP2018/072495 filed Aug. 21, 2018 which designated the U.S. and claims priority to EP Patent Application No. 17386031.3 filed Sep. 29, 2017, the entire contents of each of which are hereby incorporated by reference.

The present technique relates to the field of data processing. More particularly, it relates to transactional memory.

A data processing system may execute a number of threads of data processing. Sometimes, the threads may need to access a shared resource and the nature of the data processing operations may be such that once a thread starts interacting with the shared resource, it may be necessary for a set of operations to complete atomically using the resource without another thread accessing the resource in the meantime.

One technique for handling this conflict between threads may be to use locks to control exclusive access to at least one target resource. For example, when one thread starts accessing data in a particular address region, the thread may set a lock variable to claim ownership of the lock, and then while the lock owning thread has ownership of the lock, other threads checking the lock variable may determine that the lock is already claimed and so may not enter the section of code which interacts with that address region. Such a lock-based approach can be seen as pessimistic in that each thread by default assumes that it cannot enter the section of code which access the shared resource because a conflict with another thread may occur, unless it has ownership of the lock guaranteeing that no conflict can occur. However, often a lock identifier may control exclusive access to a number of resources (e.g. a range of addresses), and so it is not guaranteed that if one thread is accessing certain resources within the set of resources protected by the lock variable, another thread will definitely access the same resource. Hence, a lock-based approach may, in cases where conflicts between threads are rare, lead to a loss of performance because threads may unnecessarily be waiting for the locks to be released before entering the critical section of code which uses the shared resource.

A more optimistic approach for handling conflicts between threads accessing shared resources can be to use transactional memory support. A data processing system may have circuitry to support execution of a transaction within a thread of data processing by the processing circuitry. The transaction may be those instructions of the thread which are executed between a transaction start instruction marking the beginning of the transaction and a transaction end instruction marking the end of the transaction. Between the transaction start and end instructions, the processing circuitry may speculatively execute the intervening instructions and prevent commitment of the results of those speculatively executed instructions until the transaction end instruction is reached. Occurrence of an abort event following execution of the transaction start instruction (but before the transaction end instruction is reached) may result in the transaction being aborted and the speculative results being discarded. There may be a number of reasons for aborting a transaction, but one reason may be a detected conflict with a memory access made by another thread. Hence, with this approach each thread may optimistically start processing the critical section of code assuming that no conflicts with other threads will occur, and then if the end of the critical section is reached without any conflict being detected the results of the transaction can be committed. In cases where conflict is rare, using transactional memory support can improve performance by allowing more threads to concurrently process their critical sections of code.

At least some examples provide an apparatus comprising: processing circuitry to perform data processing in response to instructions, the processing circuitry comprising transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached, and to abort processing of the transaction when an abort event occurs before the transaction end instruction is reached; and exception handling circuitry to determine whether to mask an exception in dependence on exception mask information specifying whether one or more subsets of exceptions are enabled or disabled; wherein in response to an exception mask update instruction executed within a transaction to update the exception mask information to enable at least one subset of exceptions which was disabled at the start of processing of the transaction, the processing circuitry is configured to update the exception mask information and to permit unaborted processing of one or more subsequent instructions of the transaction following said exception mask update instruction.

At least some examples provide a data processing method comprising: performing data processing in response to instructions using processing circuitry comprising transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached, and to abort processing of the transaction when an abort event occurs before the transaction end instruction is reached; in response to an exception, determining whether to mask the exception in dependence on exception mask information specifying whether one or more subsets of exceptions are enabled or disabled; and in response to an exception mask update instruction executed within a transaction to update the exception mask information to enable at least one subset of exceptions which was disabled at the start of processing of the transaction, updating the exception mask information and permitting unaborted processing of one or more subsequent instructions of the transaction following said exception mask update instruction.

At least some examples provide a computer program for controlling a host data processing apparatus to provide an instruction execution environment for execution of instructions, comprising processing program logic supporting execution of a transaction within a thread of data processing, the transaction comprising instructions of the thread executed speculatively between a transaction start instruction and a transaction end instruction, for which the processing program logic is configured to prevent commitment of results of the speculatively executed instructions until the transaction end instruction is reached, and to abort processing of the transaction when an abort event occurs before the transaction end instruction is reached; and exception handling program logic to determine whether to mask an exception in dependence on exception mask information specifying whether one or more subsets of exceptions are enabled or disabled; wherein in response to an exception mask update instruction executed within a transaction to update the exception mask information to enable at least one subset of exceptions which was disabled at the start of processing of the transaction, the processing program logic is configured to update the exception mask information and to permit unaborted processing of one or more subsequent instructions of the transaction following said exception mask update instruction.

A storage medium may be provided storing the computer program described above. The storage medium may be a non-transitory computer program storage medium.

Further aspects, features and advantages of the present technique will be apparent from the following description of examples, which is to be read in conjunction with the accompanying drawings, in which:

FIG. 1 schematically illustrates an example of an apparatus comprising transactional memory support circuitry;

Figure 1:
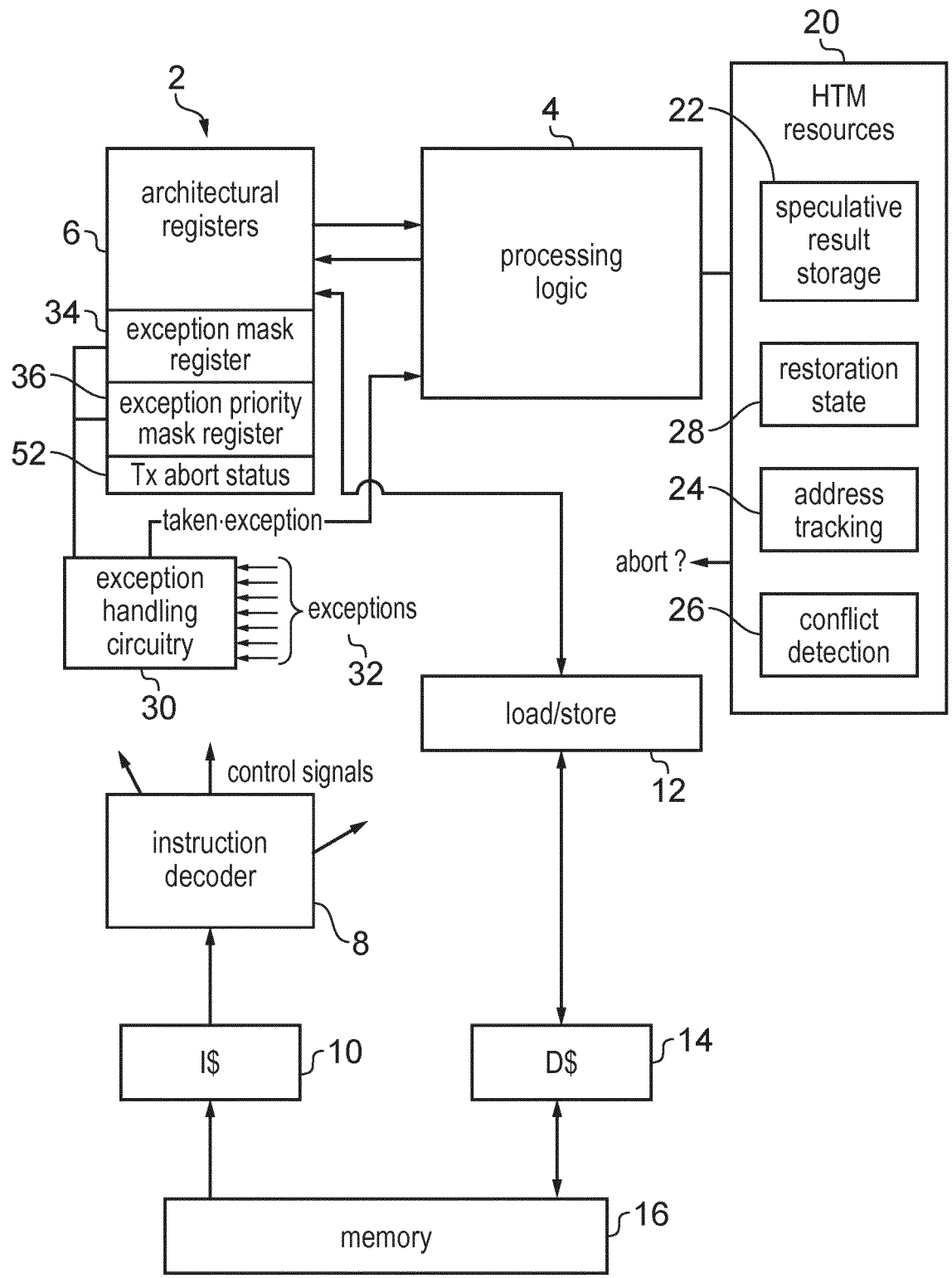

A data processing apparatus may have processing circuitry which has transactional memory support circuitry to support execution of a transaction within a thread of data processing by the processing circuitry. The transaction comprises instructions of the thread which are executed speculatively between a transaction start instruction and a transaction end instruction, for which the processing circuitry may prevent commitment of results of the speculatively executed instructions of the transaction until the transaction end instruction is reached, and may abort processing of the transaction when an abort event occurs before reaching the transaction end instruction.

The apparatus may have exception handling circuitry for controlling handling of exception conditions which may arise during the processing of instructions. An exception condition may be any event which requires the processing being performed by the processing circuitry to be suspended so that other processing can be performed. For example, the exceptions may include software-triggered exceptions, such as memory faults caused by an attempt by software to access an invalid, unmapped or inaccessible memory address, execution of an undefined instruction, or an operation performed by software which breaches security protections being enforced. Also the exceptions could include hardware interrupts triggered by external events such as a user pressing a button on the device, an external apparatus sending a request to the apparatus, a peripheral sending a signal, or some other event not directly caused by the instructions being executed by the processing circuitry itself. The exception handling circuitry may have the ability to mask out certain exceptions based on exception mask information which may specify whether one or more subsets of exceptions are enabled or disabled.

Typically, instructions which update the exception mask information would be prohibited within a transaction so that if, during processing of a transaction, an instruction which updates the exception mask information is encountered, this would lead to an abort event so that the transaction is aborted. This is typically done to avoid livelock situations which could arise due to a discrepancy between the exception mask state at the start of the transaction and exception mask state later on in the transaction.

However, the inventors recognised that it is not necessary to suppress the exception mask update instruction during the transaction. In response to an exception mask update instruction executed within a transaction to update the exception mask information to enable at least one set of exceptions which was disabled at the start of processing the transaction, the processing circuitry may update the exception mask information and permit unaborted processing of one or more subsequent instructions of the transaction that follow the exception mask update instruction. Hence there is no need to trigger an abort, or suppress the updating of the exception mask information when the exception mask update instruction is encountered. This provides greater opportunity for transactional memory mechanisms to be used for threads of processing which include exception mask update instructions, which would not otherwise be possible. This is useful because often a piece of software written by one party may refer to a piece of software written by another party or to certain functions to be run within the software of the first party which were written by others, and so it can be difficult for the programmer or compiler to know whether all the code being executed contains an exception mask update instruction, and so such code in the absence of the technique discussed above could have low performance because there may be repeated attempts to execute a transaction which may fail due to an abort caused by the presence of exception mask update instructions, and it may take some time for sufficient numbers of aborts to be detected that a non-transactional approach is taken, such as resorting to lock-based mechanisms. In contrast, with the ability to continue processing a transaction beyond an exception mask update, this can improve performance for such code.

The transactional memory support circuitry may have restoration state storage circuitry to store transaction restoration state data captured in response to the transaction start instruction. The processing circuitry may restore the transaction restoration state data in response to the abort event. The transaction restoration state data may comprise the exception mask information. Hence, in cases where there is an exception mask updating instruction within the body of the transaction which enables at least one subset of exceptions which was disabled at the start of processing the transaction, if the transaction is aborted then this may lead to the previous value of the exception mask information being restored and hence the at least one subset of exceptions becoming disabled again.

This may cause a problem because the processing circuitry may be arranged to trigger the abort event in response to occurrence of an enabled exception during processing of a transaction. When an exception occurs, the subsequent processing performed after taking the exception will generate results which are not part of the operations performed within a transaction and which should not be recorded within the speculative results set of that transaction. Similarly, conflicts between addresses accessed by the exception and addresses accessed by other threads need not be flagged in the same way as for the transaction itself. Providing sufficient resources in hardware to distinguish the exception processing from the transaction processing and resume a transaction later may be too complex to justify the added expense, and so it may be simpler simply to abort the transaction when an enabled exception occurs during processing of a transaction.

However, having aborted the transaction due to an exception, servicing of the exception may be deferred until the transaction's restoration state data has been restored. This is because the exception should see the architectural state as if the transaction never occurred, if the transaction is being aborted. Hence, if exception mask updating instructions are allowed during a transaction without aborting the transaction, so that it is possible for a previously disabled subset of exceptions to become enabled during the transaction, and then one of those newly enabled exceptions occurs and so this leads to the transaction being aborted, restoration of the previously captured restoration state may cause that subset of exceptions to be disabled before the exception is taken. The exception may then remain pending, and the software may then attempt to restart the transaction. On the next attempt to run the transaction, when the exception mask update instruction is encountered again it re-enables the subset exceptions and then the still pending exception may again trigger an abort, and this can lead to a long loop of multiple attempts to execute the same transaction without ever resolving the exception and without ever successfully completing the transaction, leading to a livelock situation. In practice, this may not necessarily hang up the processor indefinitely, since usually the software would have mechanisms for stopping attempts to restart the transaction and using a non-transactional method to execute equivalent operations if the number of aborts becomes greater than a threshold. However, it may take some time to determine this, and in the meantime there may be a lot of wasted processing in attempting to process the transaction a number of times, and a long delay before the operations are finally executed using a non-transactional method. This is one reason why typical approaches for transactional memory have disabled exception mask update instructions within a transaction or trigger an abort during the transaction.

In contrast, with the approach discussed above the exception mask updates are allowed and processing of a transaction is permitted to continue beyond the exception mask update instruction without aborting the transaction. While the transaction could still abort after the exception mask update instruction (e.g. if an exception or conflict occurs), this at least gives an opportunity to continue processing of the transaction and (if no abort arises) reach the end of the transaction and commit the results despite the exception mask information having changed status partway through the transaction.

In response to occurrence of an enabled exception during processing of a transaction, when the enabled exception was disabled at the start of processing of the transaction, the processing circuitry may set abort status information to a predetermined value. In contrast, in response to an abort event occurring for a transaction, when the abort event is triggered by an event other than the occurrence of an enabled exception, or is triggered by occurrence of an enabled exception which was also enabled at the start of processing of the transaction, the processing circuitry may set the abort status value to a value other than the predetermined value. Hence, by checking the abort status information when a transaction is aborted, the software can distinguish cases when the transaction was aborted as a result of an exception which was enabled partway through the transaction from other potential reasons for the abort. The software can then determine, for example, that the code should not attempt to run again in a transactional mode when the abort status information has the predetermined value. For example the software may instead execute equivalent functions within a non-transactional mode (e.g. branching to a path within the code which provides equivalent non-transactional operations), which may for example use a lock-based mechanism to avoid concurrent access to shared resource by multiple threads. Hence by providing the abort status information, this reduces the risk of a livelock situation, enabling the exception mask status information to change partway through a transaction without risk of significant performance bottlenecks, and therefore giving greater opportunity to use transactional memory based mechanisms for code which may need to change the status of whether exceptions are enabled or disabled.

The abort status information could be represented in different ways. In some examples, the abort status information could be a flag within a status register which is set to a first value when an enabled exception triggers an abort of a transaction and the enabled exception was disabled was the transaction started and could be set to a second value for other types of aborts. Alternatively, the abort status information could be a general abort reason code, which has a number of bits with different encodings of those bits representing different reasons for an abort of a transaction. One of the possible values of the abort status code could be a special value allocated to indicate that the abort was due to an exception which was enabled at the time of aborting the transaction but was disabled at the start of the transaction. In this case if a transaction is aborted due to an exception that was enabled partway through the transaction, then this will be reflected by a different state of the abort status code compared to the case when the exception was already enabled at the start of processing of the transaction.

There are a number of ways of representing the exception mask information. In some cases the exception mask information could specify, separately for two or more different types of the exception, whether each type of exception is enabled or disabled. For example, one flag in the exception mask information could indicate whether debug-related exceptions are enabled or disabled, another flag could indicate whether memory fault exceptions are enabled or disabled, and so on. With this type of exception mask information, the exception mask update instruction may be an instruction which changes the enable/disable flag for a particular type of exception (or for two or more types of exception) to change the flag from a disabled state to an enabled state.

Alternatively, the exception mask information may specify an exception priority threshold. The exception handling circuitry may determine whether to mask an exception depending on a comparison between a priority level of the exception and the exception priority threshold. Hence, the subset of exceptions which are currently disabled could be those exceptions which have a lower priority level than the exception priority threshold (optionally, also exceptions with a priority equal to the exception priority threshold could be disabled). It will be appreciated that exception priority levels could be represented in different ways by a numeric value. For example, the lowest numeric value (e.g. priority zero) could indicate the most important kind of exception, so that priority level 0 exceptions are considered to have a higher priority than priority level 3, for example. Alternatively, other approaches may use the highest numeric value of the priority number to represent the most important priority (e.g. with priority level 15 representing a higher priority exception than priority level 12). Hence, the term priority level in this application refers to the relative importance of the exception, independent of the actual numeric value used to represent that level of importance. In examples where the exception mask information specifies an exception priority threshold then the exception mask update instruction discussed above may be an instruction which updates the exception priority of the threshold to indicate a lower (less important) priority level so that now a greater subset of exceptions will be enabled.

While the examples above discuss an exception mask update instruction which enables a previously disabled exception, other types of exception mask update instruction which update the exception mask information to disable a previously enabled exception may also be allowed within a transaction, without aborting the transaction.

The transactional memory support circuitry may include a number of resources for supporting execution of transactions using transactional memory mechanisms. For example the transactional memory support circuitry may comprise restoration state storage circuitry for storing transaction restoration state captured in response to the transaction start instruction to be restored on aborting the transaction. In some cases, the transaction start instruction of an outer transaction may trigger the capture of the transaction restoration state and capture of the transaction restoration state for inner transactions may be suppressed (when the transaction nesting depth is greater than zero at the time of encountering the transaction start instruction).

The transactional memory support circuitry could also comprise speculative result storage circuitry to store the results of at least some speculatively executed instructions for at least one transaction of at least one thread. In some cases only certain types of instructions may have their results stored to the speculative results storage circuitry, for example store instructions for writing to memory may have their store data held speculatively in the speculative result storage until the transaction can be committed, whereas general arithmetic instructions acting on registers could simply write to those registers as the restoration state can later allow those results to be discarded when state is rewound to an earlier point of execution.

The transactional memory support circuitry may also have conflict detection circuitry for detecting a conflict between a data access to a given address made within a transaction of a first thread and a data access to the same address made by another thread. An abort event can be triggered by the conflict detection circuitry in response to the detection of the conflict. Other reasons for abort events could include interrupts or exceptions occurring during the processing of a transaction, a lack of capacity in the storage within the transactional memory support circuitry for accommodating further speculative results of the transaction, or certain instructions that are not allowed to be accessed in a transaction being encountered. The transactional memory support circuitry may also have address tracking circuitry for tracking addresses accessed by instructions within a transaction, and the conflict detection circuitry may use the tracked addresses to identify the conflicts with other threads.

A corresponding computer program may control a host data processing apparatus to provide an instruction execution environment for execution of instructions, in which processing program logic enables unaborted processing of instructions following an exception mask update instruction as discussed above. Such a computer program may allow a generic host data processing apparatus which does not itself have the transactional memory support circuitry to benefit from the transactional memory functionality and the improved testing of nesting depth, even though there may be no actual hardware providing these features. Instead the computer program provides program logic, such as sets of instructions or data structures, which emulate this functionality, enabling the generic host data processing apparatus to execute code intended for execution on an apparatus which does provide such hardware features.

FIG. 1 illustrates an example of a data processing apparatus 2 with hardware transactional memory (HTM) support. The apparatus has processing logic 4 for executing instructions to carry out data processing operations. For example the processing logic 4 may include execution units for executing various types of processing operations, such as an arithmetic/logic unit (ALU) for carrying out arithmetic or logical operations such as add, multiply, AND, OR, etc.; a floating-point unit for performing operations on floating point operands; or a vector processing unit for carrying out vector processing on vector operands comprising multiple data elements. A set of architectural registers 6 is provided for storing operands for the instructions executed by the processing logic 4 and for storing the results of the executed instructions. An instruction decoder 8 decodes instructions fetched from an instruction cache 10 to generate control signals for controlling the processing logic 4 or other elements of the data processing apparatus 2 to perform the relevant operations. A load/store unit 12 is also provided to perform load operations (in response to load instructions decoded by the instruction decoder 8) to load a data value from a data cache 14 or main memory 16 into the architectural registers 6, and store operations (in response to store instructions decoded by the instruction decoder 8) to store a data value from the architectural registers 6 to the data cache 14 or memory 16.

The apparatus 2 also has transactional memory support circuitry 20 which provides various resources for supporting hardware transactional memory (HTM). The HTM resources in the transactional memory support circuitry 20 may include for example speculative result storage 22 for storing speculative results of transactions, address tracking circuitry 24 for tracking the addresses accessed by a transaction, conflict detection circuitry 26 for detecting conflicts between data accesses made by a transaction and data accesses made by other threads, so that a transaction can be aborted when a conflict is detected, and restoration state storage circuitry 28 for storing a snapshot of the architectural state data from the architectural registers 6 at the start of a transaction, so that this state can be restored to overwrite the speculative results of the transaction when a transaction is aborted.

The apparatus 2 also has exception handling circuitry 30 which controls the handling of exceptions 32, which represent events which require the processing logic 4 to suspend its current processing and switch to some other operations. Exception handler code stored in the memory 16 may define the operations to be performed in response to certain types of exceptions, and the exception handling circuitry 30 may maintain an exception vector table indicating the addresses of the corresponding exception handlers for different types of exception. The architectural state 6 may include an exception mask register 34 and an exception priority mask register 36 for providing exception mask information for determining whether the exception handling circuitry 30 should act upon subsets of exception 32 which may arise.

Figure 2:
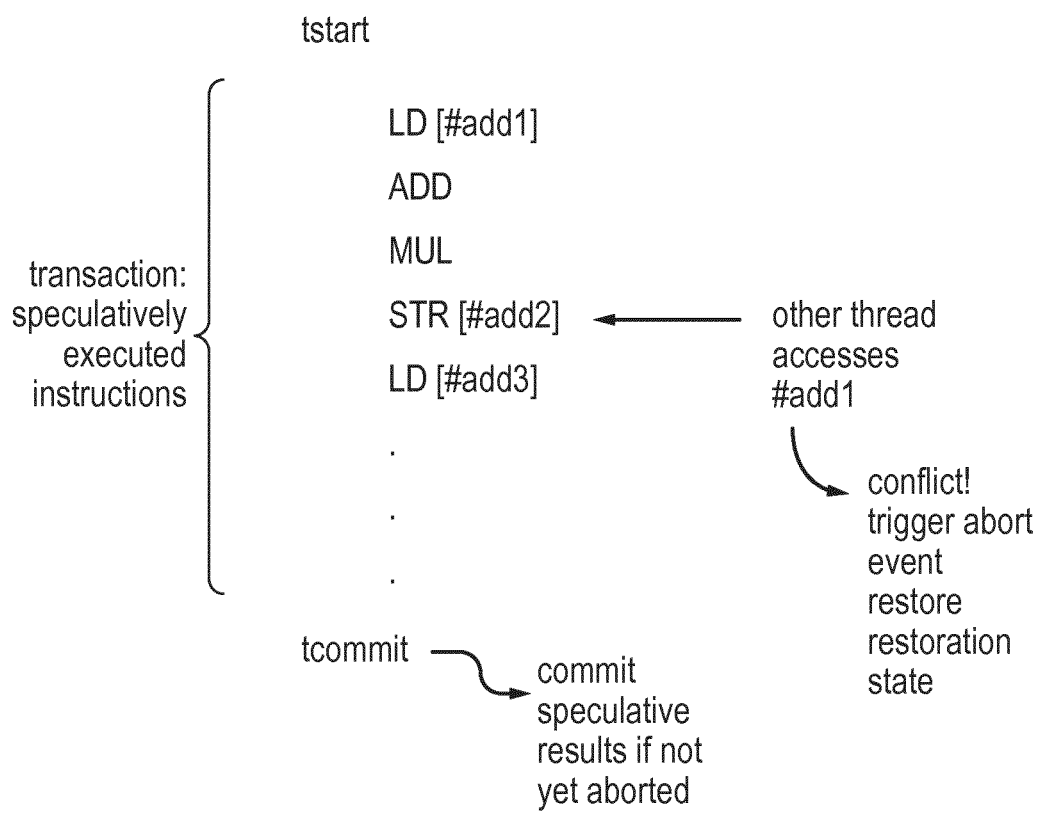
FIG. 2 shows an example of processing of a transaction.

FIG. 2 shows an example of executing a transaction within a given thread using the transactional memory support circuitry 20 and the processing logic 4. A transaction is a section of program code which is bounded by a transaction start instruction (tstart) and a transaction end instruction (tcommit). As shown in FIG. 2, in response to the transaction start instruction the current architectural state in the architectural registers 6 is captured and stored in the restoration state storage circuitry 28. The processing logic 4 begins to perform speculative execution of the subsequent instructions following the tstart instruction, and as these instructions are executed, the addresses accessed by those instructions are tracked by the address tracking circuitry 24, and the conflict detection circuitry 26 detects conflicts between the tracked addresses and addresses of made accesses using the load/store unit 12 in response to other threads. At least some speculative results of the instructions within the transaction are stored within the speculative result storage circuitry 22. For example the value stored the cache or to memory in response to a store instruction STR may be held in the speculative result storage 22 while the transaction remains pending. If the transaction end instruction (tcommit) is reached without an abort event occurring in the meantime, then in response to the transaction end instruction the speculative results are committed. On committing the transaction, any results stored in the speculative results storage 22 for that thread may be written to the data cache 14 or memory 16 and the restoration state 28 can be discarded or permitted to be overwritten as it is no longer needed to rewind architectural state to the point before the transaction start instruction was encountered.

On the other hand, if an abort event occurs, for example when a conflict is detected by the conflict detection circuitry 26 when another thread accesses an address already accessed by the transaction, then an abort of the transaction is triggered and the restoration state from the restoration state storage 28 is restored to the architectural registers 6. Other causes of an abort event could for example include execution of an instruction which is not allowed to be executed within a transaction, insufficient resource within the speculative result storage 22 or an address tracking circuitry 24 for handling the speculative results or addresses required by a given transaction, or an interrupt being received during the transaction.

Figure 3:
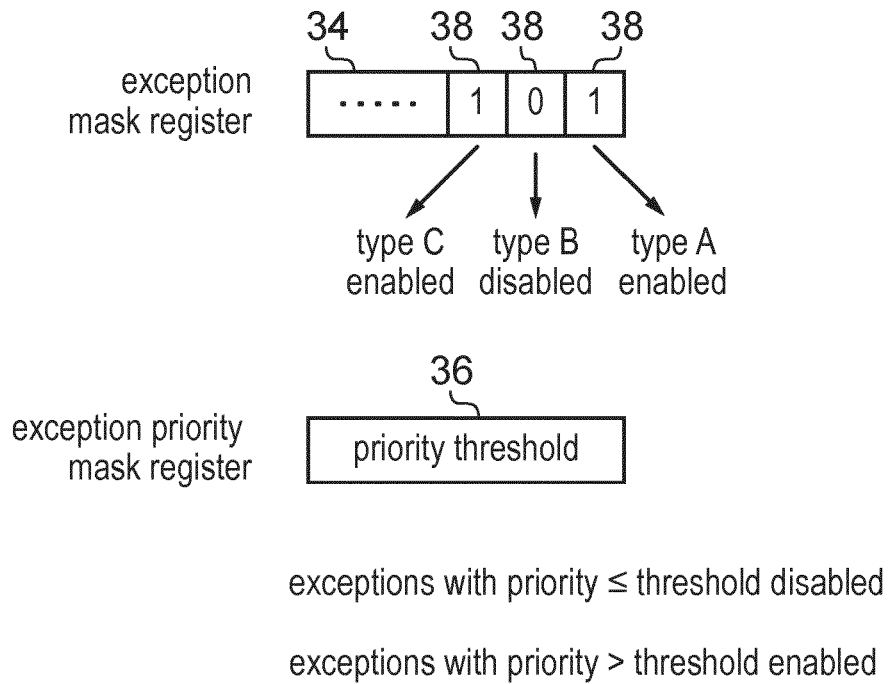
FIG. 3 shows two examples of exception mask information.

FIG. 3 shows an example of the contents of the exception mask register 34 and the exception priority mask register 36. The exception mask register includes a series of flags 38 which each correspond to a certain type of exception 32 and specifies whether that exception is enabled or disabled. In the mapping shown in FIG. 3, a flag value of 1 indicates that the exception is enabled (not masked) and a flag value of 0 indicates that the exception type is disabled (masked), but it will be appreciated that the opposite mapping could also be used. When an exception type is disabled, then even if that exception occurs, this does not lead to the processing logic 4 being interrupted. However, the assertion of the exception signal for the disabled exception may remain pending and so if later the exception is unmasked (enabled) while that exception still remains pending, then at that point the exception may be signalled to the processor 4.

Similarly, the exception priority mask register 36 may define a threshold priority level. An exception with a priority level less than or equal to that threshold may be considered disabled (masked) and an exception to the priority level greater than the threshold may be enabled (unmasked). It will be appreciated that the mask information in registers 34, 36 may not be the only information used to determine whether to signal a taken exception to the processing logic 4. For example, the priority level may also be used, so that when multiple enabled exceptions occur, a higher priority exception is signalled ahead of a lower priority exception. Similarly, signalling of an exception to the processing logic 4 may depend on a comparison of the priority level of the code which is currently being executed with the priority level associated with the incoming exception.

Figure 4:
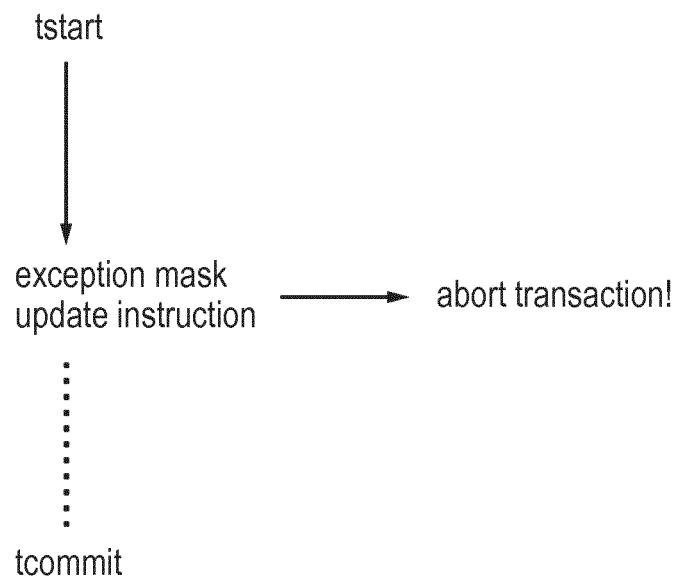
FIG. 4 shows a comparative example of aborting a transaction when an exception mask updating instruction is executed within a transaction.

FIG. 4 shows for comparison a typical approach to handling changes to the exception mask registers 34, 36 during a transaction. An exception mask update instruction may change the values in the exception mask register 34 or exception priority mask register 36. Typically such an instruction may lead to an abort of the transaction so that it is not possible to complete a transaction successfully which contains an update to the exception mask registers 34, 36. This may be performed regardless of whether the exception mask update instruction is enabling or disabling a subset of exceptions, although as shown in FIG. 5 the more significant problem is when the exception mask update instruction results in an additional subset of instructions becoming enabled which were disabled at the start of the transaction.

Figure 5:
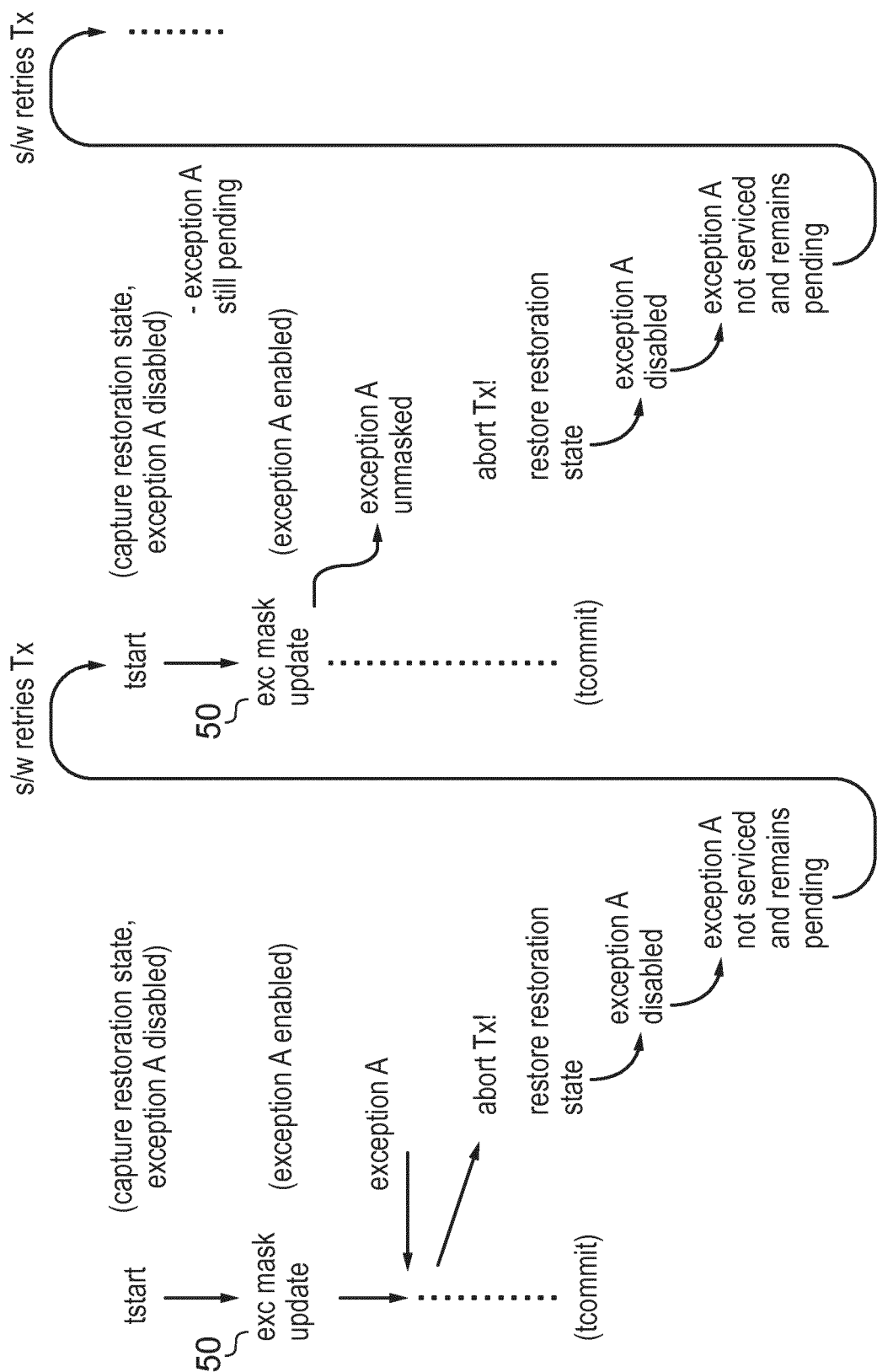
FIG. 5 shows a problem which may arise if exception mask updates are allowed to enable processing of a previously disabled exception partway through a transaction.

FIG. 5 shows a livelock problem which could arise if exception mask updates are allowed during a transaction and the transaction is allowed to proceed beyond the exception mask update. FIG. 5 shows an example where a transaction start instruction, tstart, is executed at a time when a certain subset of exceptions A is disabled. The subset of exceptions A could be a particular type of exception for which the corresponding exception mask flag 38 is disabled, or could be a subset of exceptions with a priority level less than or equal to the current priority threshold in the register 36. Speculative processing of the instructions of the transaction then begins, and an exception mask updating instruction 50 is reached which triggers an update to one or both of the exception mask registers 34, 36 so that now the subset of exceptions A becomes enabled. Subsequently, an exception within the subset A occurs and this leads to aborting the transaction. At this point, the restoration state stored in the restoration storage 28 is restored to the architectural registers 6, including restoring the exception mask information associated with registers 34 and 36. At this point, since at the time of the transaction start instruction the subset of exceptions A was disabled, the restoration of state results in exception A being disabled again. While usually the exception would be taken after the transaction has aborted, since the state restoration has resulted in the subset of exceptions A being disabled, the exception is masked and so it will not be taken. Nevertheless the corresponding exception signal 32 remains pending.

The software which comprises this transaction may then attempt to reschedule the transaction and start again from the transaction start instruction as shown on the right hand part of FIG. 5. Again, the restoration state is captured and the processing of the transaction begins, but the exception A remains pending. Hence, when the exception mask updates instruction is reached again, the exception A is enabled and unmasked, and the transaction will abort again because the exception is still pending. This again triggers restoration of this restoration state, and the disabling of the exception A because of the difference between the state pending at the time of the abort and the state indicated by the restoration state storage 28. Hence, this is the same condition that occurred on the first attempt to execute the transaction. The software may again try to repeat the transaction and this can lead to a livelock loop, where the software repeatedly keeps trying to execute the transaction, which keeps failing because at the point when the subset of exceptions A is enabled there is an exception of that subset pending and this immediately aborts the transaction. This livelock loop may continue until either the exception is deasserted or the software determines that enough attempts have been made at executing the transaction and switches to a non-transactional mode of execution. Such a livelock loop can be harmful to performance and this is why typically the approach in FIG. 4 has been taken, where any exception mask update instruction will abort the transaction.

Figure 6:
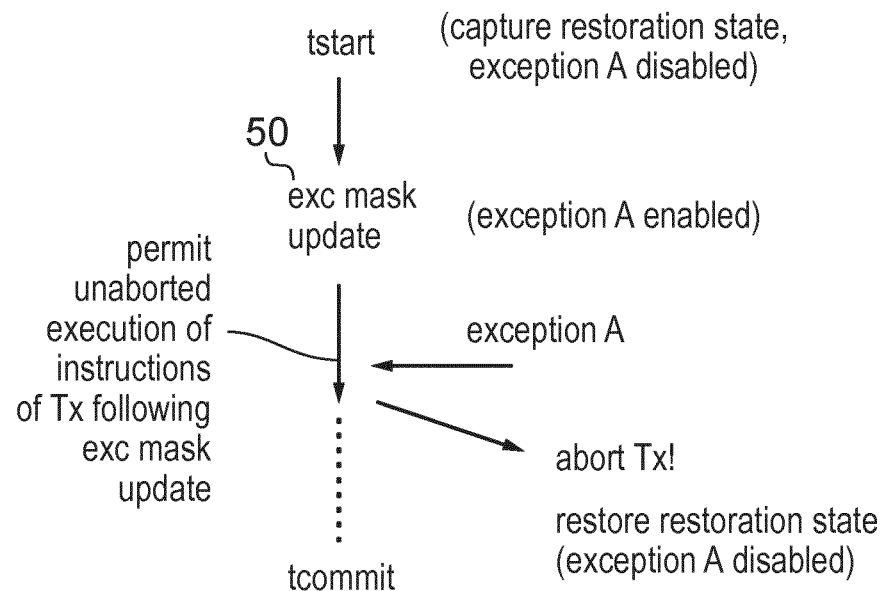
FIG. 6 shows a technique for addressing this problem by enabling exception mask updates within a transaction and reporting status information if an exception which was enabled by the mask update triggers an abort of the transaction.
Figure 6:
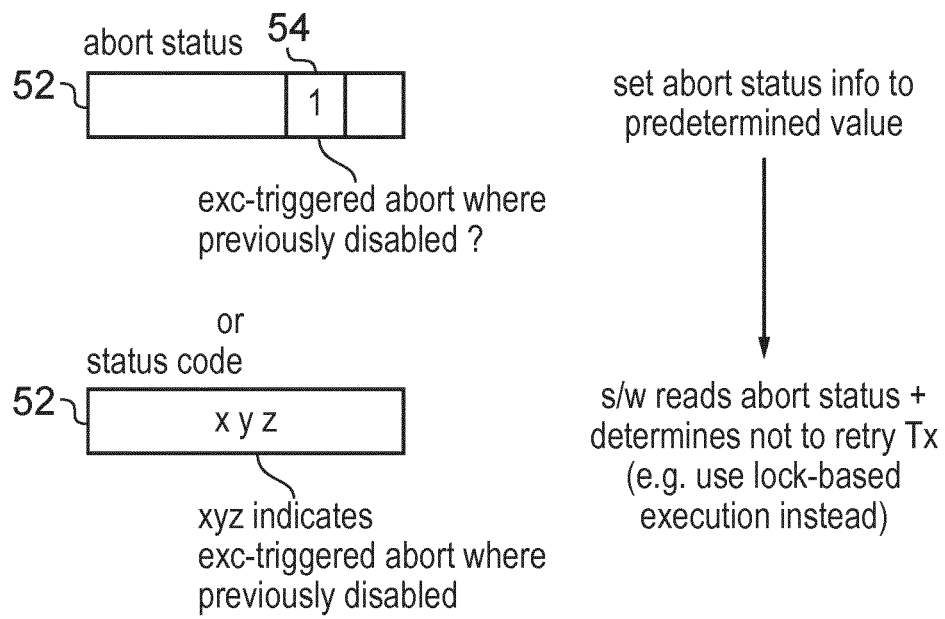

In contrast, FIG. 6 shows a different approach. In this example the exception mask updating instruction 50 is allowed during the transaction, and the unaborted execution of instructions of the transaction following the exception mask updating instruction 50 is permitted. While there may be other reasons to abort the transaction after the exception mask updating instruction, such as a detected conflict by the conflict detection circuitry 26, a lack of resources within speculative result storage 22 or address tracking storage 24, or on occurrence of an exception, if no other event occurs which requires an abort, then the transaction is able to reach the transaction end instruction tcommit even if an exception mask updating instruction 50 is included which switches the mask information from a disabled state to an enabled state for at least a subset of exceptions. This makes the transactional mode of execution available for additional code sequences which would not previously have been able to use it, increasing the opportunity for performance savings by using the transactional mode rather than more pessimistic models such as lock-based code.

To reduce the risk of the livelock situation on aborting a transaction due to an exception which is currently enabled but was disabled at the time of starting the transaction, an abort status value within a transaction abort status register 52 is set to a predetermined value to indicate cause of the abort. FIG. 6 shows two alternative approaches to indicate in the abort status information. In one example, the abort status register 52 may have a flag 54 which is set to a first value (e.g. binary 1) when the abort was triggered by an exception which was previously disabled at the start of the transaction. In another approach the abort status register 52 may store a status code which may have some particular bit pattern [x y z] which indicates that the abort was triggered by an exception currently enabled which was previously disabled at the start of the transaction (with all other abort reasons using a different bit pattern of the status code). Regardless of how the abort status information is represented, this provides architectural support for enabling the software to determine the cause of the abort. The software can read the abort status information 52 and determine that the reason for the abort was that the enabling of the exception lead to an abort and it is likely that this will occur again if the transaction is repeated. Hence, the software can determine not to retry the transaction and for example use lock-based execution instead. Hence, this reduces the chance that the livelock arises while increasing the opportunities for using transactional modes for code including exception mask updates.

Figure 7:
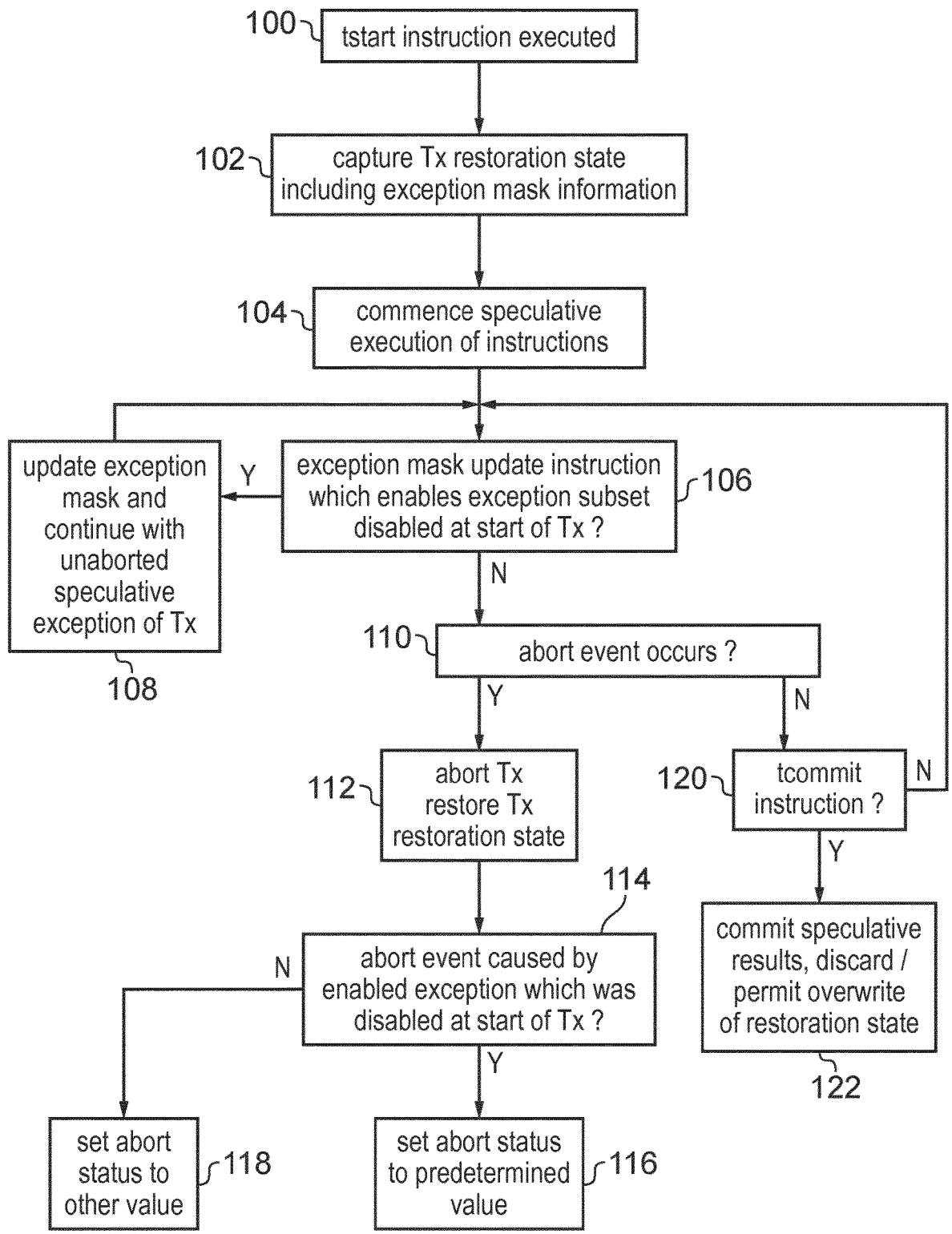
FIG. 7 is a flow diagram illustrating a method of processing of transactions.

FIG. 7 is a flow diagram showing processing of instructions in a transactional mode. At step 100 a transaction start instruction is encountered by the instruction decoder 8. The instruction decoder 8 generates control signals, which at step 102 control the processing logic 4 to capture current architectural state from the registers 6 (including the exception mask information in registers 34, 36) and store the captured state within the restoration state storage 28. In some implementations, this restoration state capture may be performed only for the very first transaction start instruction which is executed when there is no other transaction pending. If nesting of transactions occurs, when a second transaction start instruction is encountered before reaching the end of a previous transaction, then the restoration state capture could be suppressed for those further nested transactions to reduce complexity.

At step 104, the speculative execution of instructions following the transaction start instruction commences. The address tracking circuitry 24 starts recording addresses accessed by the instructions of the transaction, and the conflict detection circuitry 26 checks for conflicts between those addresses and addresses accessed by other threads.

At step 106, the instruction decoder 8 checks whether an exception mask update instruction has been encountered which enables a subset of exceptions which was disabled at the start of the transaction, and if so at step 108 the processing logic 4 is controlled to update the exception mask information in one or both of the registers 34, 36 and then to continue with unaborted speculative execution of the transaction. Hence the exception mask update does not trigger an abort of the transaction. If no exception mask update is encountered then at step 110 it is checked whether any abort event has occurred. The abort event could, for example, be the occurrence of an enabled exception (not currently masked by the exception mask register 34 or exception priority mask register 36), a conflict detected by the conflict detection circuitry 26, the execution of an instruction which is not allowed to be executed within a transaction, or there being insufficient capacity in one of the HTM tracking structures 22, 24 to accommodate further storage of information for the current transaction.

If an abort event occurs, then at step 112 the transaction is aborted and the restoration state is restored from the restoration state storage 28 to the architectural register 36. At step 114 the processing logic 4 or exception handling circuitry 30 determines whether the abort event was caused by an enabled exception which was disabled at the start of the transaction. This can be determined by comparing the newly restored exception mask register 34 and exception priority mask register 36 with the properties of the exception which led to the abort. If the abort event was caused by an enabled exception which was disabled at the start of the transaction, then at step 116 the abort status register 52 is set to a predetermined value. Otherwise, the abort status register 52 set to a different value representing the reason for the abort. This informs software as to the reasons so that the software can take a conditional branch to a repeated attempt to execute the transaction again or to alternative lock-based code, depending on the abort status information. Hence, the abort status information, including a specific status value identifying aborts triggered by enabled exceptions which were unmasked during the transaction, enable a better decision to be taken on how to reschedule the operations corresponding to the aborted transaction.

If no abort event occurs at step 110, then transaction processing carries on. At step 120 it is determined whether a transaction end instruction (tcommit) has been encountered by the instruction decoder 8, and if so then control signals are generated to trigger the processing logic 4 at step 122 to commit any speculative results of the transaction and discard or permit overwriting of the restoration state within the restoration state storage 28 that is associated with the transaction. The committing of speculative results may include, for example, writing results of store instructions from the speculative result storage 22 to the data cache 14 or memory 16. In some instances, the committing of speculative results may not be performed for all transaction end instructions. For example, with nested transactions only the final transaction end instruction of the outer transaction of a nested set could trigger committing of the speculative results, and any inner transaction's transaction end instruction could be ignored. Also, in some cases there may be other criteria to check, on reaching a transaction end instruction, whether the speculative results can actually be committed.

If no transaction end instruction has yet been reached at step 120, then the method returns to step 106 and cycles round until at least one of the events checked at steps 106, 110 and 120 has occurred.

Figure 8:
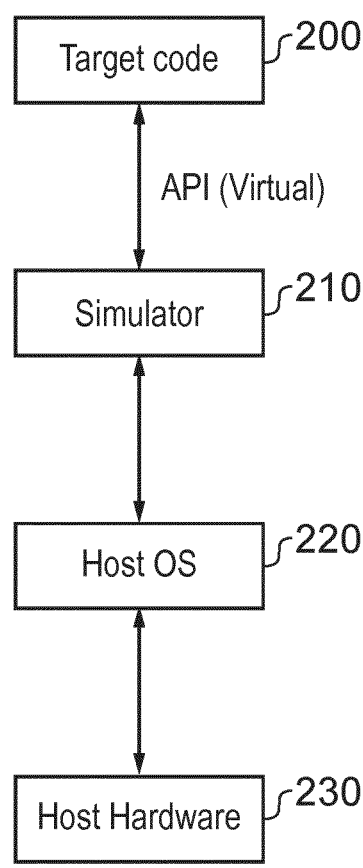
FIG. 8 illustrates a simulator example that may be used.

FIG. 8 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200 may be executed from within the instruction execution environment using the simulator program 210 to handle exception mask update instructions within a transaction in the way discussed above, so that a host computer 230 which does not actually have the hardware features of the apparatus 2 discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   processing circuitry to perform data processing in response to instructions, the processing circuitry comprising hardware transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached, and to abort processing of the transaction when an abort event occurs before the transaction end instruction is reached;
   exception handling circuitry responsive to an exception to determine whether to mask the exception in dependence on exception mask information specifying whether one or more subsets of exceptions are enabled or disabled, wherein in response to the mask information specifying that the exception is disabled, the exception handling circuitry is configured to mask the exception;
   wherein in response to an exception mask update instruction executed within the transaction to update the exception mask information to enable at least one subset of exceptions which was disabled at the start of processing of the transaction, the processing circuitry is configured to permit unaborted processing of one or more subsequent instructions of the transaction following said exception mask update instruction;
   wherein the processing circuitry is configured to trigger said abort event in response to occurrence of an enabled exception during processing of a transaction;
   wherein in response to occurrence of an enabled exception during processing of the transaction, when said enabled exception was disabled at the start of processing of the transaction, the processing circuitry is configured to set abort status information to a predetermined value indicating that the enabled exception was disabled at the start of processing of the transaction and then was enabled during processing of the transaction; and wherein in response to an abort event occurring for the transaction, when the abort event is triggered by an event other than occurrence of an enabled exception or is triggered by occurrence of an enabled exception which was enabled at the start of processing of the transaction, the processing circuitry is configured to set said abort status information to a value other than said predetermined value.

2. The apparatus according to claim 1, wherein the hardware transactional memory support circuitry comprises restoration state storage circuitry to store transaction restoration state data captured in response to the transaction start instruction.

3. The apparatus according to claim 2, wherein the processing circuitry is configured to restore the transaction restoration state data in response to said abort event.

4. The apparatus according to claim 3, wherein said transaction restoration state data comprises said exception mask information; and in response to occurrence of an enabled exception during processing of a transaction, the processing circuitry is configured to trigger said abort event and to defer servicing the exception until the transaction restoration state data has been restored.

5. The apparatus according to claim 2, wherein said transaction restoration state data comprises said exception mask information.

6. The apparatus according to claim 1, wherein the exception mask information specifies, separately for a plurality of types of exception, whether each type of exception is enabled or disabled.

7. The apparatus according to claim 1, wherein the exception mask information specifies an exception priority threshold, and the exception handling circuitry is configured to determine whether to mask an exception depending on a comparison between a priority level of the exception and the exception priority threshold.

8. The apparatus according to claim 1, wherein the hardware transactional memory support circuitry comprises at least one of:

speculative result storage circuitry to store said results of the speculatively executed instructions; and address tracking circuitry to track addresses accessed by instructions within a transaction.

9. The apparatus according to claim 1, wherein the hardware transactional memory support circuitry comprises conflict detection circuitry to detect a conflict between a data access to a given address made within the transaction of a first thread and a data access to the same address made by another thread.

10. The apparatus according to claim 9, wherein the conflict detection circuitry is configured to trigger said abort event in response to detection of the conflict.

11. A data processing method comprising:

performing data processing in response to instructions using processing circuitry comprising hardware transactional memory support circuitry to support execution of a transaction within a thread of data processing by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached, and to abort processing of the transaction when an abort event occurs before the transaction end instruction is reached;

in response to an exception, determining whether to mask the exception in dependence on exception mask information specifying whether one or more subsets of exceptions are enabled or disabled, and masking the exception in response to the mask information specifying that the exception is disabled;

in response to an exception mask update instruction executed within the transaction to update the exception mask information to enable at least one subset of exceptions which was disabled at the start of processing of the transaction, updating the exception mask information and permitting unaborted processing of one or more subsequent instructions of the transaction following said exception mask update instruction;

triggering said abort event in response to occurrence of an enabled exception during processing of the transaction;

in response to occurrence of an enabled exception during processing of the transaction, when said enabled exception was disabled at the start of processing of the transaction, setting abort status information to a predetermined value indicating that the enabled exception was disabled at the start of processing of the transaction and then was enabled during processing of the transaction; and in response to an abort event occurring for the transaction, when the abort event is triggered by an event other than occurrence of an enabled exception or is triggered by occurrence of an enabled exception which was enabled at the start of processing of the transaction, setting said abort status information to a value other than said predetermined value.

12. A non-transitory storage medium storing a computer program for controlling a host data processing apparatus to provide an instruction execution environment for execution of instructions, comprising:

processing program logic supporting execution of a transaction within a thread of data processing, the transaction comprising instructions of the thread executed speculatively between a transaction start instruction and a transaction end instruction, for which the processing program logic is configured to prevent commitment of results of the speculatively executed instructions until the transaction end instruction is reached, and to abort processing of the transaction when an abort event occurs before the transaction end instruction is reached;

exception handling program logic responsive to an exception to determine whether to mask the exception in dependence on exception mask information specifying whether one or more subsets of exceptions are enabled or disabled, wherein when the mask information specifies that the exception is disabled, the exception handling program logic is configured to mask the exception;

wherein in response to an exception mask update instruction executed within a transaction to update the exception mask information to enable at least one subset of exceptions which was disabled at the start of processing of the transaction, the processing program logic is configured to update the exception mask information and to permit unaborted processing of one or more subsequent instructions of the transaction following said exception mask update instruction;

wherein the processing program logic is configured to trigger said abort event in response to occurrence of an enabled exception during processing of a transaction;

wherein in response to occurrence of an enabled exception during processing of the transaction, when said enabled exception was disabled at the start of processing of the transaction, the processing program logic is configured to set abort status information to a predetermined value indicating that the enabled exception was disabled at the start of processing of the transaction and then was enabled during processing of the transaction; and wherein in response to an abort event occurring for the transaction, when the abort event is triggered by an event other than occurrence of an enabled exception or is triggered by occurrence of an enabled exception which was enabled at the start of processing of the transaction, the processing program logic is configured to set said abort status information to a value other than said predetermined value.

* * * * *